(12) United States Patent
Takano

(10) Patent No.: US 6,680,553 B1
(45) Date of Patent: Jan. 20, 2004

(54) ROTATING ELECTRICAL APPARATUS

(75) Inventor: Tadashi Takano, Mori-machi (JP)

(73) Assignee: Kabushiki Kaisha Moric, Shuuchi-gun (JP)

( * ) Notice: Subject to any disclaimer, the term of this patent is extended or adjusted under 35 U.S.C. 154(b) by 123 days.

(21) Appl. No.: 09/442,895

(22) Filed: Nov. 18, 1999

(30) Foreign Application Priority Data

Nov. 19, 1998 (JP) .......................................... 10-329879

(51) Int. Cl.⁷ ................................................. H02K 3/00
(52) U.S. Cl. ................................. 310/68 B; 310/156.05
(58) Field of Search ............................... 310/68 B, 66, 310/67 R, 68 R, 261, 156, 264, 265; 370/156.05, 156.06, 156.07, 156.32

(56) References Cited

U.S. PATENT DOCUMENTS

| | | | | |
|---|---|---|---|---|
| 4,311,933 A | * | 1/1982 | Riggs et al. | 310/156 |
| 4,792,712 A | * | 12/1988 | Stokes | 310/156 |
| 4,982,125 A | * | 1/1991 | Shirakawa | 310/88 |
| 5,223,759 A | | 6/1993 | Shimoda et al. | 310/156 |
| 5,225,725 A | * | 7/1993 | Shiraki et al. | 310/12 |
| 5,565,721 A | * | 10/1996 | Knappe | 310/68 B |
| 5,717,268 A | * | 2/1998 | Carrier et al. | 310/156 |
| 5,877,574 A | * | 3/1999 | Molnar | 310/215 |

FOREIGN PATENT DOCUMENTS

| | | |
|---|---|---|
| DE | 36 38 541 A | 6/1987 |
| EP | 0 359 854 A | 3/1990 |
| EP | 0 557 932 A | 9/1993 |
| FR | 2 583 514 A | 12/1986 |
| FR | 2 6941 854 A | 12/1993 |

OTHER PUBLICATIONS

European Search Report dated Mar. 20, 2000.
Patent Abstracts of Japan, vol. 1996, No. 2, Feb. 29, 1996 & JP 07 264820 A (Fujitsu General Ltd), Oct. 13, 1995.
Patent Abstracts of Japan, vol. 17, No. 630 (E–1463), Nov. 22, 1993 & JP 05 199724 A (Shibaura Eng Works Co Ltd), Aug. 6, 1993.
Patent Abstracts of Japan, vol. 1996, No. 6, Jun. 28, 1996 & JP 08 051746 A (Sanwa Chem KK), Feb. 20, 1996.

* cited by examiner

Primary Examiner—Dang Le
(74) Attorney, Agent, or Firm—Ernest A Beutler

(57) ABSTRACT

A brushless DC rotating machine that employs permanent magnets on the rotor and a magnet carrier that is juxtaposed to the rotor and which cooperates with a sensor for providing signals indicative of the angular position of the rotor. The magnets are carried by a magnet carrier that is disposed radially inwardly of the armature windings of the stator so as to provide a compact assembly.

13 Claims, 6 Drawing Sheets

ROTATING ELECTRICAL APPARATUS

BACKGROUND OF THE INVENTION

This invention relates to a rotary electrical machine, and particularly to a brushless motor, flywheel magneto or generator.

With many types of rotary electrical apparatus such as motors or generators, there must be provided an arrangement for conveying or receiving electrical current between the rotor winding and the affixed contacts in the machine housing to change the polarity. This is generally done by a brush and commutator arrangement. However, the use of brushes and commutators has a number of disadvantages.

First, the brushes are constantly in sliding engagement with the commutators and thus, there is the problem of wear and noise generation. Also the commutator elements must be electrically insulated from each other. In addition, sparks frequently occur between the sliding surfaces and thus, this type of machine requires regular maintenance and inspection.

Therefore, there has been proposed a type of machine which is called a brushless DC machine that employs permanent magnet fields on the rotor and an armature as the stator. Electric current switching is performed by semiconductor devices such as Hall elements instead of commutators and brushes. This provides a machine that does not require servicing, and produces a higher output more efficiently because of the less frictional drag. Also this avoids the noise and sparking of the prior art type of constructions.

Oftentimes, these devices are utilized as motors in office or factory automation and somewhat less frequency as a power drive for mobile objects such as motor-driven vehicles. The reason for the somewhat limited later type of use is that conventional permanent magnets employing ferromagnetic materials have relatively large size and weight. Also, in many applications, the electrical power is provided by a battery and hence, there are relatively low voltages available and this necessitates high current flows.

Finally, because this device does not have sparking, it is usable in environments where conventional electric motors cannot be employed. However, it is necessary to provide a relatively well-sealed and water-tight arrangement.

With the use of higher efficiency permanent magnets made by rare earth metals, the application of these devices to operation with motor vehicles for driving accessories thereof has become more feasible. However, it is still important to maintain a small and compact size and good relative sealing.

As has been noted, the electrical current switching is performed by a semiconductor devices such as Hall elements. Conventionally, this requires the use of magnetic pole position detectors which are comprised of radially magnetized magnets that are fixed to or carried by discs that rotates in synchronism with the rotor. Hall elements are disposed in close proximity to the peripheral edges of the magnets and provide the necessary signals for switching the current flow to the windings.

With this type of arrangement, however, the rotating magnet carrying disc is spaced from the rotor and outwardly from the armature. In addition, the positioning of the magnets is generally radially outwardly from the rotor and at one end of the armature so that the overall size of the machine becomes quite large. This, therefore, offsets some of the advantages of the utilization of this type of machine.

It is, therefore, a principal object of this invention to provide an improved sensor arrangement for a brushless DC machine.

It is a further object of this invention to provide an improved and compact rotary position sensor for such a machine.

SUMMARY OF THE INVENTION

This invention is adapted to be embodied in a rotating electrical machine that has an outer housing in which a stator is mounted. The stator is provided with a plurality of armatures consisting of poles and surrounding armature windings. The stator cooperates with a rotor on which a plurality of circumferentially spaced permanent magnets are affixed. A magnet position sensor arrangement is provided for switching the windings of the armature coils. This sensor arrangement includes a disc that is fixed for rotation with the rotor and which carries a plurality of circumferentially spaced permanent magnets. This disc is disposed radially inwardly of the inner periphery of the armature and cooperates with a sensing plate that mounts a plurality of circumferentially spaced Hall elements.

DETAILED DESCRIPTION OF THE PREFERRED EMBODIMENTS OF THE INVENTION

Figure 1:
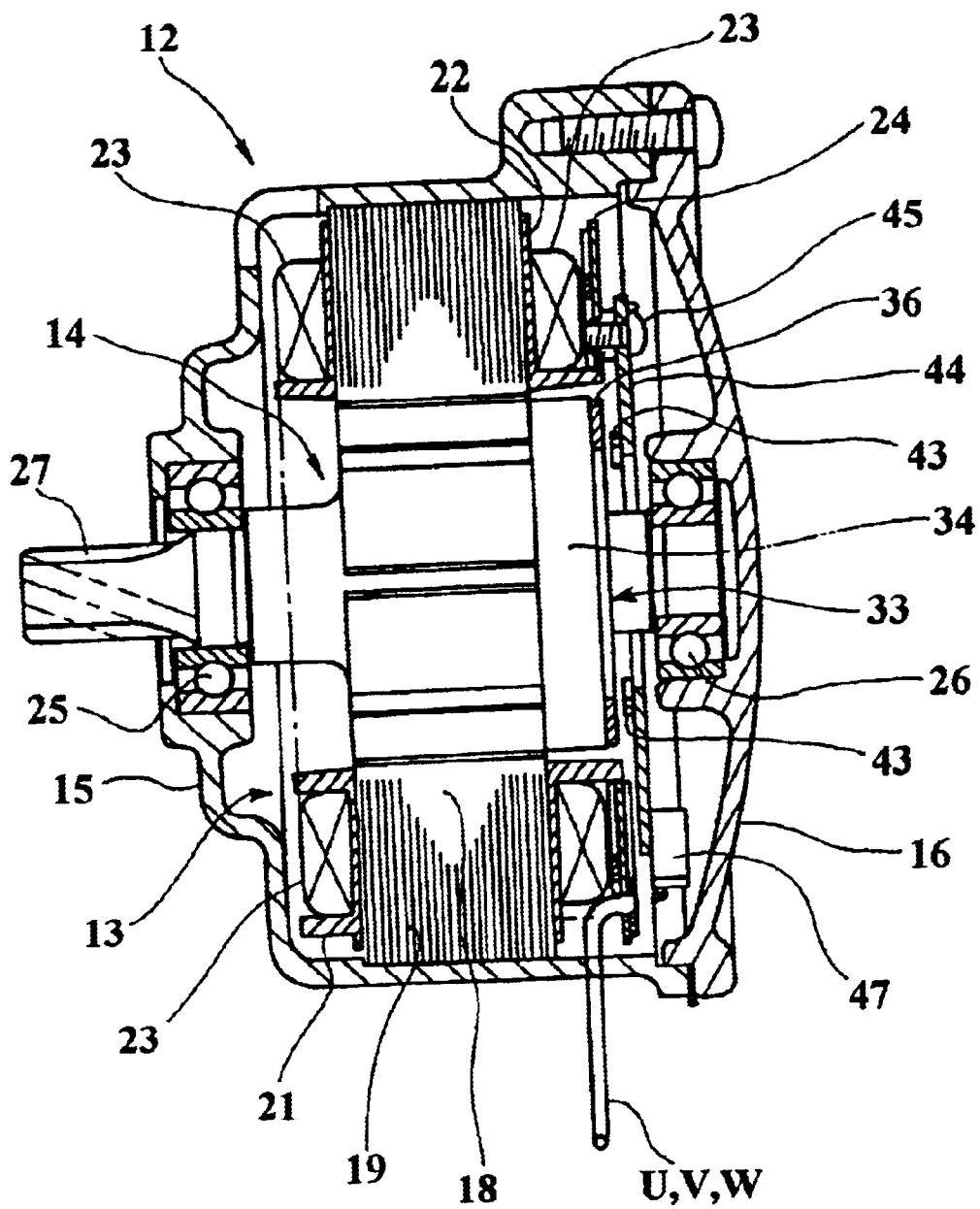
FIG. 1 is a cross-sectional view taken through a rotating electrical machine such as a DC brushless motor that is constructed and operated in accordance with an embodiment of the invention.
Figure 2:
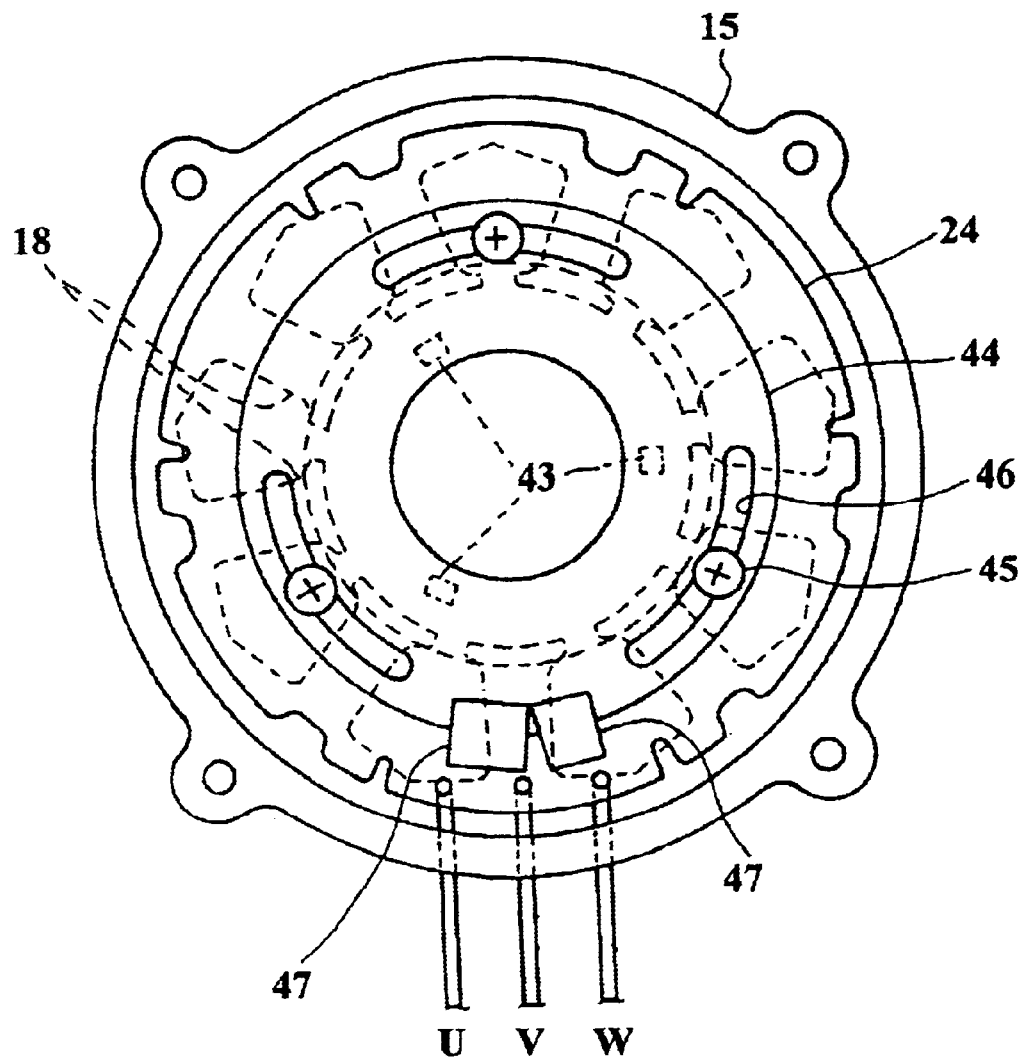
FIG. 2 is a view of the machine looking in the direction of the arrow 2 in FIG. 1 with the cover plate removed.

Referring now in detail to the drawings and initially primarily to FIG. 1, a brushless DC motor is shown in cross-section and identified generally by the reference numeral 11. The motor 11 functions as a three phase, alternating current, synchronous motor. The invention is described in conjunction with a brushless DC motor, but it is to be understood that it may be utilized with other electrical machines including electrical generating devices, such as flywheel magnetos or generators. Therefore, the device is referred to generally as a rotary electrical machine and in a preferred embodiment, comprises a motor.

The machine 11 includes an outer housing assembly, indicated generally by the reference numeral 12, in which a stator or armature assembly, indicated generally by the reference numeral 13, is positioned. A rotor, indicated generally by the reference numeral 14, is supported in the housing assembly 12 in a manner which will be described.

The housing assembly 12 is comprised of a main housing piece 15 that has a generally cup shape and which is formed from a suitable material which may be of any known type. This housing piece defines an internal cavity wherein the armature 13 and main portion of the rotor 14 are positioned. This cavity is closed by a cover plate 16 that is affixed to the main housing piece 15 in a suitable manner, as by threaded fasteners 17.

The stator or armature assembly 13 is comprised of a plurality of poles or cores, indicated generally by the reference numeral 18, which extend radially inwardly from the housing piece 15 toward the rotor 14. These cores or poles 18 are made up of laminated soft iron plates 19 which may be formed as stampings or the like and which are stacked in relationship to each other.

These cores 18 are engaged on opposite sides by insulating plates 21 and 22 which are formed from a suitable non-conductive material, such as a plastic or the like. Between the cores 18, these plastic insulating plates 21 and 22 have inwardly extending fingers that correspond to the spacing around the cores.

An electrical coil or armature winding 23 encircles each core 18 and extends axially beyond the cores as seen in FIG. 1 relative to the axis of rotation of the rotor 14. Preferably, these windings are formed from a highly conductive material, such as copper or the like, which is insulated by a suitable coating, such as an enamel coating, formed on its outer surface. The terminal ends of each winding 23 are connected, in a manner to be described, to a terminal plate, indicated generally by the reference numeral 24 and which preferably has a construction as described in my copending application entitled "DC Brushless Machine", Ser. No. 09/442,892 filed concurrently herewith and assigned to the assignee hereof.

This permits attachment to three external power cables, indicated by the reference characters U, V, and W for connection to a suitable electrical source when the machine 11 functions as a motor. These cables can receive generated power if the machine 11 is functioning as a generator.

In the illustrated embodiment, this electrical source may comprise a three-phase electrical system, although obviously other types of power supplies can be employed. For this purpose, the armature windings 23 are arranged in three groups.

The rotor 14 is journaled within the housing assembly 12 by a first bearing 25 that is carried by the main housing member 15 and a second bearing 26 that is carried by the cover plate 16. The rotor 14 has an extending end portion on which a drive gear 27 may be provided for driving a load of any desired type. This geared end portion 27 protrudes outwardly beyond the main cover member 15. If the machine 11 functions as a generator, the rotor 14 will be driven in any appropriate manner.

Figure 3:
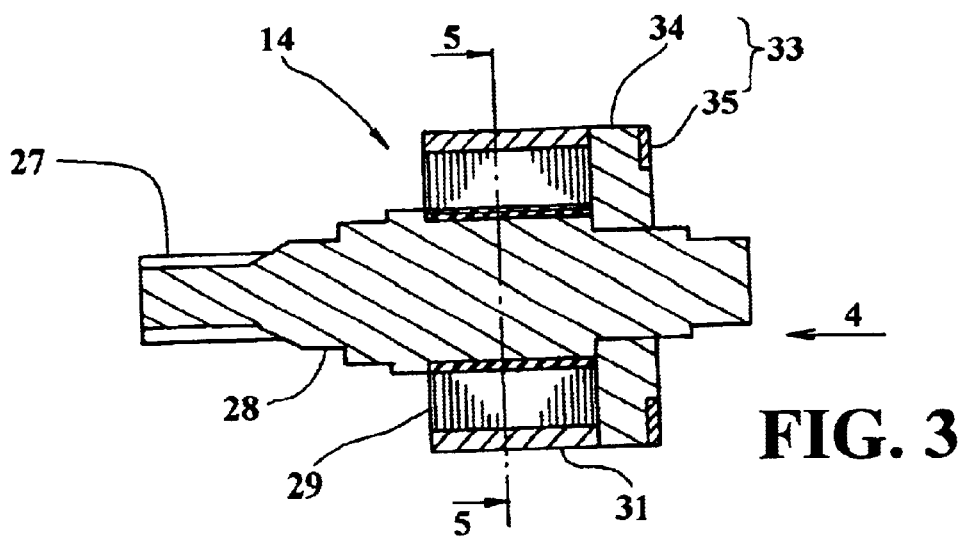
FIG. 3 is an enlarged cross-sectional view of the rotor of the machine taken in the same direction as FIG. 1.

The construction of the rotor 14 will be described now primarily to FIGS. 3–7 and initially to FIGS. 3 and 6. The rotor 14 is comprised of an inner shaft portion 28 upon which the drive gear 27 may be integrally formed. A yoke 29 is mounted on this shaft 28 by means which may include an elastic sleeve.

The yoke 29 may conveniently be formed as a soft iron laminate made out of stamped sheets. For example, these may be formed from the scrap center portions from which the armature plates 19 are stamped.

Figure 5:
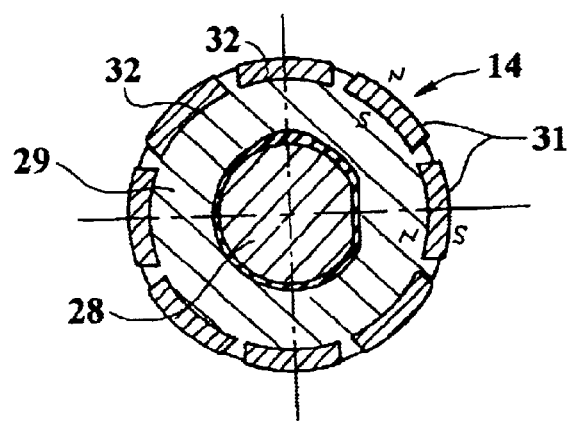
FIG. 5 is a cross-sectional view of the rotor taken along the line 5—5 of FIG. 3.

Bonded to the exterior portion of this yoke 29 are a plurality of generally arcuately-shaped permanent magnets 31. These permanent magnets 31 are received in slots 32 formed in the periphery of the yoke magnetized so that their north and south poles (n, s) are disposed in radially spaced directions in alternating patterns as seen in FIG. 5. Preferably, these magnets 31 arc formed from a high efficiency material such as neodymium. These may be bonded to the yoke 29 before being magnetized and then magnetized in the radial direction after adhered thereto.

For use in detecting the position of the magnetic poles on the rotor 14 and in accordance with the invention, there is provided a magnetic detector ring, indicated generally by the reference numeral 33, and which has a, construction as best seen in FIGS. 3–7. This ring 33 is comprised in major part of an insulating member 34 and an annular, ring type magnet carrier 35.

The insulating member 34 is formed as an annular member constructed from a suitable plastic material. The magnet carrier 35 has a material which will be described shortly and is adhered to this insulating ring 34 in a manner which will be described. The detector ring 33 has a diameter that is slightly smaller than the overall diameter of the remainder of the rotor 14 as may be best seen in FIG. 1 so as to provide a clearance around the inner periphery of the armature 13 and to permit this assembly to be nested within the armature 13 to provide an extremely compact construction.

Figure 4:
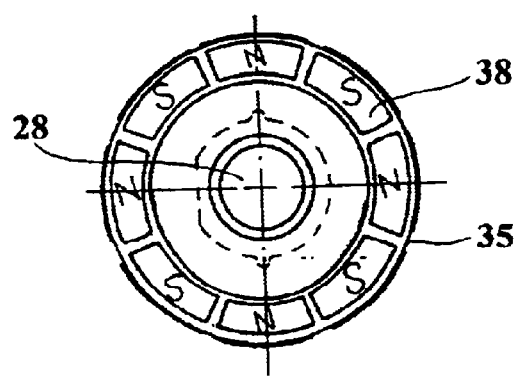
FIG. 4 is an end elevational view of the rotor looking in the same general direction as FIG. 2 and in the direction of the arrow 4 in FIG. 3.
Figure 6:
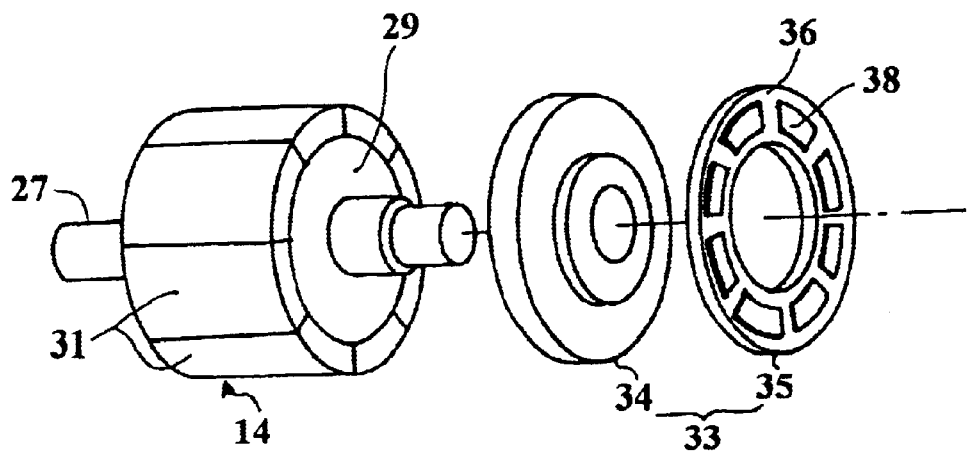
FIG. 6 is an exploded perspective view of the rotor.
Figure 7:
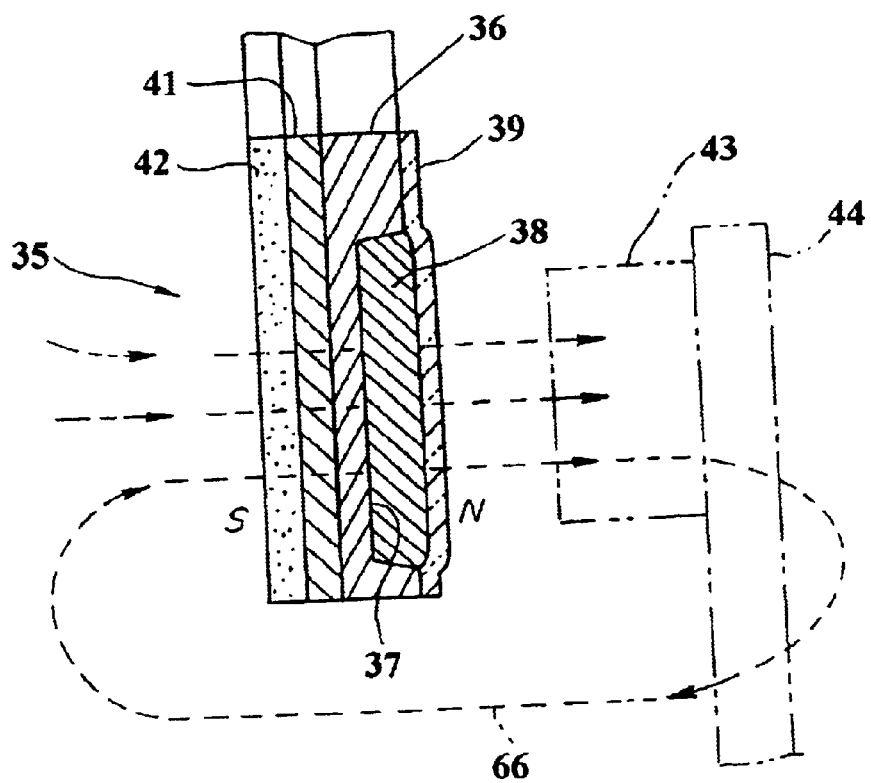
FIG. 7 is an enlarged cross-sectional view taken through a portion of the sensor plate of the rotor and shows its relationship to the detector ring, in phantom.

As may be best seen in FIGS. 4, 6 and 7, the magnet carrier 35 is formed from a base piece or a substrate 36 which is formed from a polyester resin or the like and which is formed with recesses 37 in its face which receive nine sheet like magnets 38. These magnets 38 may be made by solidifying a paste acrylic resin mixed with powdered or particulate magnetic material. This is frequently referred to as a "paste magnet". The magnetic material is preferably a rare earth such as Nd-Fe-B (neodymium-Fe-Boron).

These magnets 38 are magnetized in the axial direction or in the direction of their thickness as shown by the polarity indicated in FIG. 7. As seen in FIG. 4, the magnets 38 are positioned in the magnet carrier recesses 37 so that their polarity alternates in a circumferential direction around the magnet carrier 35.

A protective film 39 formed from a transparent acrylic resin extends across the face of the carrier ring 36 and assists in maintaining the magnets 38 in position and protecting them.

The carrier ring 36 may be supplied by a supplier and has an acrylic adhesive layer 41 formed on the back side thereof which is covered by a removable protective sheet 42. The protective film 42 is supplied and then removed when the magnet carrier ring 36 is affixed to the mounting insulating ring 34 to complete the assembly of the detector ring 33.

The assembly can be done by first affixing the magnet carrier 35 to the insulating ring 34 before assembling it on to the rotor assembly 14. Then, the assembly 33 may be positioned on the face of the rotor 14 and the magnetic action between the magnets 31 of the rotor 14 and the magnets 38 of the detector ring 33 will automatically provide the relative radial location. A indicator mark may then placed on the assembly and these parts (14 and 33) can be affixed together in a suitable manner such as by means of an adhesive between the yoke 29 and the insulating ring 34.

Alternatively, the insulating ring 34 may be affixed to the rotor 14 by an adhesive and then the magnet carrier ring 35 is attached to it. In this case, it is preferable that backing or protective film 42 be formed in radially segmented strips that can be peeled off individually. Thus, with this method, the magnet carrier ring 36 including the adhesive 41 and backing strip 42 is placed over the assembled insulating ring 34 and rotor 14. Again, the magnetic forces will provide the positioning.

Then, one circumferential position of the magnet carrier 35 is mechanically held in place and another circumferentially spaced portion is bent away from the insulating ring 34. At this time a strip of the film 42 is removed. This portion then can be adhesively bonded by pressing the two members together.

Then progressing circumferentially around the assembly, successive strips of the backing film 42 can be removed and the carrier ring 35 adhered to the insulating member 34 when it is already assembled to the rotor 14.

Referring now again to the construction of the machine 11, the magnetic detector ring 33 cooperates with a sensor arrangement that is comprised of three Hall elements 43 that are mounted on an annular mounting element 44. This mounting element 44 is, in turn, fixed to the wiring plate 24 by means of three circumferentially spaced threaded fasteners 45 which pass through elongated slots 46 formed in the mounting plate 44 so as to provide angular adjustment of the positions of the Hall sensors 43.

The Hall elements 43 are of the surface mounting type and are surface mounted to a printed circuit (not shown). This printed circuit that provides an output through conductors 47 to a suitable external control device.

Since the sensor or magnet carrier ring 33 is positioned inside of the ends of the coil windings 23, as seen in FIG. 1, and since the sheet like magnets 38 are magnetized in the axial direction, the Hall elements 43 can be positioned quite close to these magnets 38 so as to facilitate the passage of the magnetic flux, as indicated in FIG. 7 by the reference numeral 66 can easily pass to the Hall elements 43.

In the embodiment as thusfar described, the recesses 32 for receiving the permanent magnets 31, as best seen in FIG. 5, were formed directly in the iron plates that form the yoke 29. However, other types of constructions can be employed. For example, the permanent magnets 31 could be affixed to an outer peripheral surface of the yoke 29 by bonding. This requires utilizing a special fixture or jig so as to locate the magnets prior to the bonding.

Figure 8:
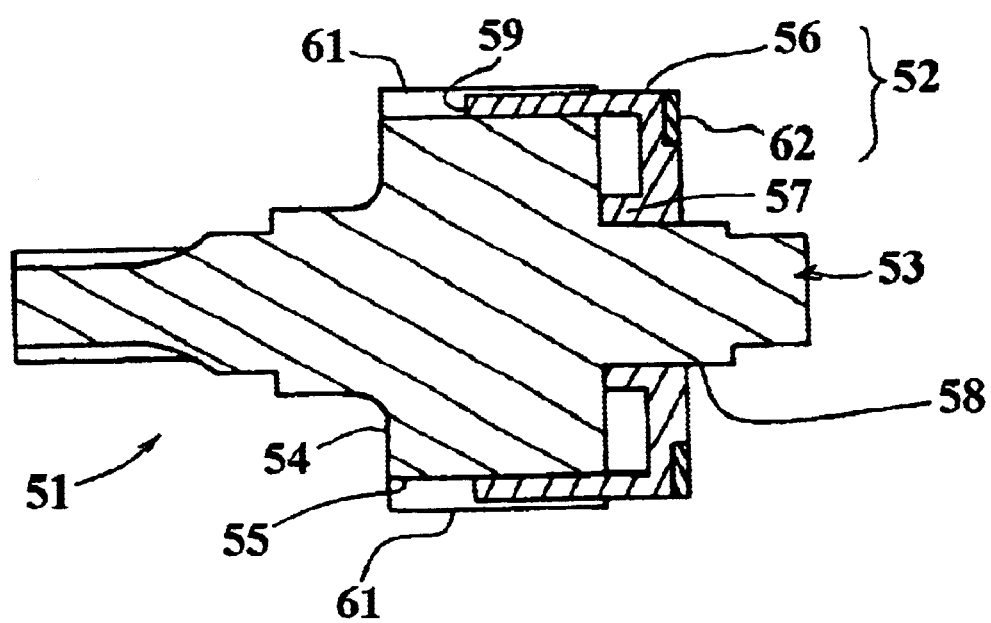
FIG. 8 is a cross-sectional elevational view in part similar to FIG. 3 and taken along the line 8—8 of FIG. 10, but shows another embodiment of rotor construction.
Figure 9:
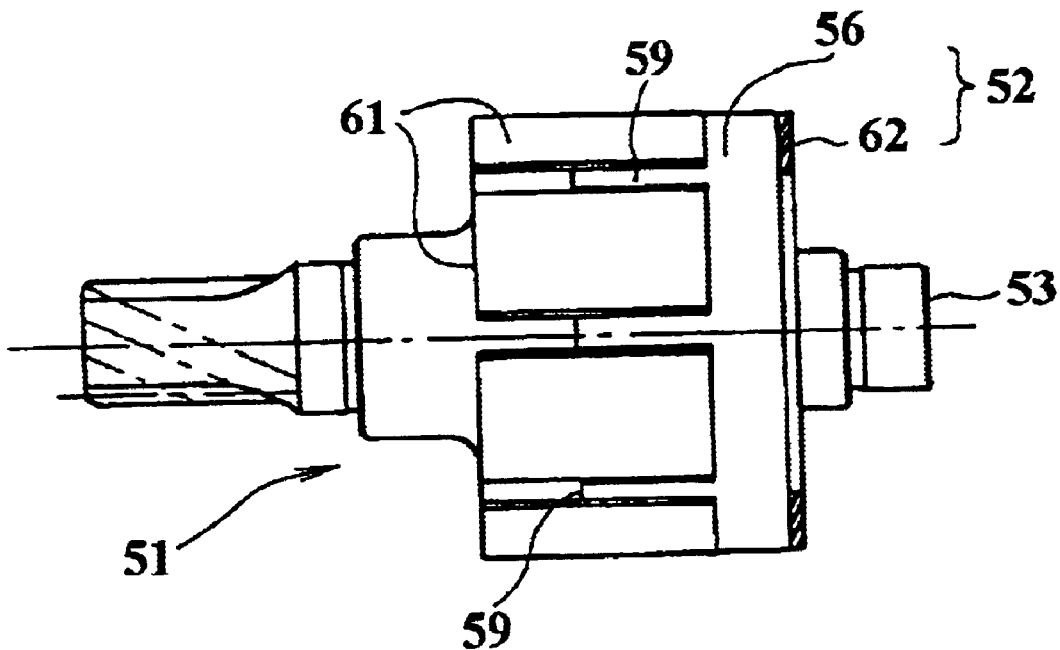
FIG. 9 is a side elevational view of this embodiment.
Figure 10:
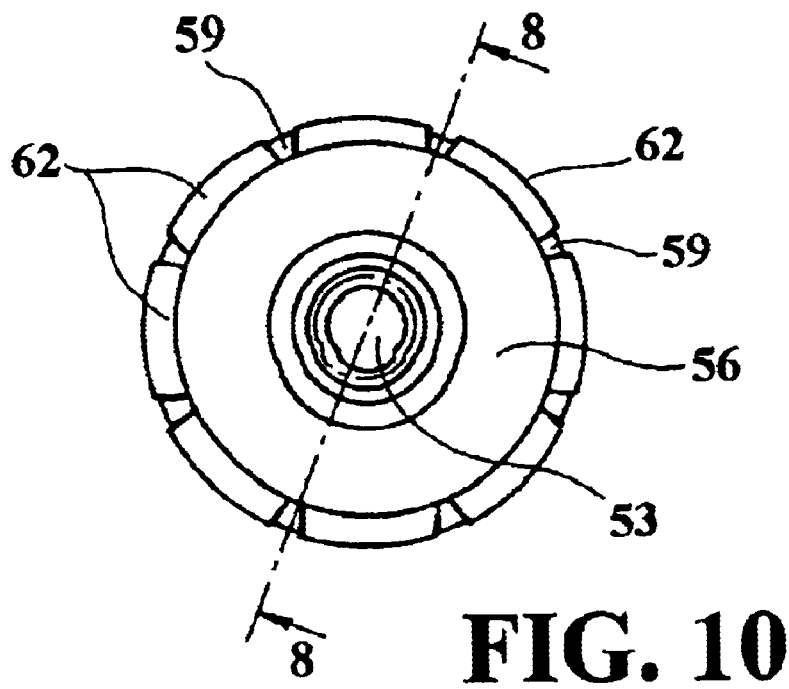
FIG. 10 is an end elevational view of this embodiment.

FIGS. 8–10 show another embodiment by which, the rotor, indicated in this figure by the reference numeral 51 can be formed and integrated with the magnet carrier assembly, indicated generally by the reference numeral 52. In this embodiment, the rotor 51 is formed by an integral shaft and yoke portion, indicated by the reference numeral 53 which has an enlarged yoke portion 54 that is formed as a solid piece with the remaining body thereof. Thus, the yoke portion 54 forms a smooth uninterrupted outer cylindrical surface 55.

The magnet carrier 52 is formed by an annular member 56 that has a hub portion 57 that is received on a stepped diameter part 58 of the rotor shaft 53. From the hub portion 58, there are a plurality of axially extending curved fingers 59 which, function as spacers for locating permanent magnets 61 that are affixed, as by bonding, to the cylindrical surface 55 of the yoke part 54. As a result, it is not necessary to use any jigs or fixtures for locating the magnets 61. The fingers 59 performs this function.

In a suitable manner, the detector magnets, which are again plate-type magnets, indicated by the reference numeral 62, are fixed, suitably to the front face of the carrier 56. In this embodiment, the magnets 62 may be formed from plate-like sintered alloy which is bonded to the base carrier 56 in a suitable manner. The magnets 62 may be of the neodymium type and as such will have a high magnetic flux density so that the space between them and the hull elements 43 can be somewhat greater to reduce manufacturing tolerances.

Of course, the foregoing description is that of preferred embodiments of the invention and various changes and modifications may be made without departing from the spirit and scope of the invention, as defined by the appended claims.

What is claimed is:

1. A rotating electrical machine having an outer housing carrying a stator, a rotor journaled within said outer housing for rotation about a rotor axis and cooperating with said stator, said stator being formed by a plurality of armatures having poles and surrounding radially extending armatures windings, a first plurality of circumferentially spaced permanent magnets carried on said rotor for cooperation with said armature, and a magnet carrier fixed for rotation with said rotor for cooperation with a detector fixed to said outer housing for controlling said armature windings, said magnetic carrier carrying a second plurality of circumferentially spaced permanent magnets spaced axially from said first plurality of circumferentially spaced permanent magnets and disposed radially inwardly of a radial inter periphery of said armature windings and disposed axially within the axial extent of the armature windings in the direction of the rotor axis.

2. A rotating electrical machine as set forth in claim 1, wherein the magnet carrier comprises a non magnetic carrier element having the second plurality of circumferentially spaced magnets imbedded therein.

3. A rotating electrical machine as set forth in claim 2, wherein the second plurality of circumferentially spaced magnets of the magnet carrier are magnetically aligned with the first plurality of permanent magnets of the rotor.

4. A rotating electrical machine as set forth in claim 1, wherein the second plurality of permanent magnets carried by the magnet carrier are of the sheet type and are affixed to a face of magnet carrier that faces away from the rotor and are covered by a protective coating.

5. A rotating electrical machine as set forth in claim 4, wherein the second plurality of circumferentially spaced magnets of the magnet carrier arc magnetically aligned with the first plurality of permanent magnets of the rotor.

6. A rotating electrical machine as set forth in claim 5, wherein the detector comprises a detector plate carrying a plurality of circumferentially spaced Hall elements positioned at one side of the armature.

7. A rotating electrical machine as set forth in claim 1, wherein the magnet carrier has a plurality of axially extending projections that extend along the outer periphery of the rotor and between which the first plurality of permanent magnets of the rotor are positioned.

8. A rotating electrical machine as set forth in claim 1, wherein the second plurality of permanent magnets carried by the magnet carrier are of the sheet type and are affixed to a face of the magnet carrier that faces away from the rotor and are covered by a protective coating.

9. A rotating electrical machine as set forth in claim 8, wherein the second plurality of circumferentially spaced magnets of the magnet carrier are magnetically aligned with the first plurality of permanent magnets of the rotor.

10. A rotating electrical machine as set forth in claim 9, wherein the detector comprises a detector plate carrying a plurality of circumferentially spaced Hall elements positioned at one side of the armature.

11. A rotating electrical machine as set forth in claim 1, wherein the detector comprises a mounting plate having a plurality of circumferentially spaced Hall sensors mounted in facing relationship to the permanent magnets of the magnet carrier.

12. A rotating electrical machine having an outer housing carrying a stator, a rotor journaled within said outer housing for rotation about a rotor axis and cooperating with said stator, said stator being formed by a plurality of armatures having poles and surrounding radially extending armatures windings, a first plurality of circumferentially spaced permanent magnets carried on said rotor for cooperation with said armature, and a magnet carrier fixed for rotation with said rotor for cooperation with a detector fixed to said outer housing for controlling said armature windings, said magnet carrier carrying a second plurality of circumferentially spaced permanent magnets spaced axially from said first plurality of circumferentially spaced permanent magnets and disposed radially inwardly of a radial inner periphery of said armature windings, said magnet carrier being adhesively bonded to said rotor.

13. A rotating electrical machine as set forth in claim 12, wherein a face of the magnet carrier that faces a corresponding face of the rotor carries the adhesive bonding material for bonding the magnet carrier to the rotor.

\* \* \* \* \*